United States Patent
Herrera et al.

(10) Patent No.: US 11,579,708 B2
(45) Date of Patent: Feb. 14, 2023

(54) KEYBOARD EMULATION

(71) Applicant: HEWLETT-PACKARD DEVELOPMENT COMPANY, L.P., Houston, TX (US)

(72) Inventors: Virginia Q Herrera, Houston, TX (US); Christoph Graham, Houston, TX (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 110 days.

(21) Appl. No.: 16/080,258

(22) PCT Filed: Apr. 28, 2017

(86) PCT No.: PCT/US2017/030044
§ 371 (c)(1),
(2) Date: Aug. 27, 2018

(87) PCT Pub. No.: WO2018/199976
PCT Pub. Date: Nov. 1, 2018

(65) Prior Publication Data
US 2021/0191529 A1    Jun. 24, 2021

(51) Int. Cl.
*G06F 3/023* (2006.01)
*G06F 9/4401* (2018.01)
*G06F 9/44* (2018.01)

(52) U.S. Cl.
CPC ............... *G06F 3/023* (2013.01); *G06F 9/44* (2013.01)

(58) Field of Classification Search
CPC ................................................ G06F 9/4411
See application file for complete search history.

(56) References Cited

U.S. PATENT DOCUMENTS

| 6,633,905 B1 | 10/2003 | Anderson et al. |
| 6,664,982 B1 | 12/2003 | Bi |
| 8,601,571 B2 | 12/2013 | Kim |
| 2002/0091850 A1 | 7/2002 | Perholtz et al. |
| 2004/0064743 A1 | 4/2004 | Bolian et al. |
| 2004/0078503 A1 | 4/2004 | Zaudtke et al. |
| 2008/0139195 A1 | 6/2008 | Marsyla et al. |
| 2013/0332719 A1 | 12/2013 | Hormuth et al. |
| 2014/0089487 A1 | 3/2014 | Debate et al. |

FOREIGN PATENT DOCUMENTS

WO    2008085798 A1    7/2008

OTHER PUBLICATIONS

"Remote PC Access", Citrix, Retrieved from internet—https://docs.citrix.com/en-us/xenapp-and-xendesktop/7-6-long-term-service-release/xad-build-new-enviroment/xad-plan-remotepcaccess.html, Aug. 10, 2016, 4 Pages.

*Primary Examiner* — Gustavo Polo
(74) *Attorney, Agent, or Firm* — Quarles & Brady LLP

(57) ABSTRACT

Examples associated with keyboard emulation are described. One example system includes an input/output controller. The system also includes a remote signal receiver. A control module receives a first signal via the remote signal receiver. Based on the first signal, the control module communicates with the input/output controller to emulate a keyboard input.

20 Claims, 6 Drawing Sheets

KEYBOARD EMULATION

BACKGROUND

Computers today are used in a variety of ways. Personal computers, for example, are used by users with a variety of user interface peripherals including keyboards, mice, displays, and so forth. Servers, on the other hand, are often operated without these peripherals and instead rely on a network connection to perform various functions such as controlling what applications should be operated on the server, what tasks are performed by the servers, what data the servers store, and so forth. Computers that have been configured to be controlled via a network without a display, keyboard, and mouse are sometimes referred to as headless systems.

BRIEF DESCRIPTION OF THE DRAWINGS

The present application may be more fully appreciated in connection with the following detailed description taken in conjunction with the accompanying drawings.

DETAILED DESCRIPTION

Systems, methods, and equivalents associated with keyboard emulation are described. Because headless devices can generally be controlled remotely, headless devices are often stored in racks, in out of the way spaces (e.g., a locked storage), or even in remote locations. While they may generally operate without a user having to physically access the device, there are still some scenarios where being able to physically interact with a device is desirable. For example, certain operating system hangs may make it desirable to force a device to restart.

Consequently a remote signal receiver may be embedded into a device to allow receipt of wireless signals to control emulation of keyboard and power inputs to the device. The remote signal receiver may receive a signal (e.g., infrared) from a remote control that controls a component of the device to act as it were receiving inputs from a keyboard or a physical power button on the device. This may allow, for example a user to select boot settings during a basic input/output system mode of the device, hard reset the device, and so forth, without being able to physical reach the device or have a keyboard attached to the device.

While some examples herein may refer to headless devices, in other examples, techniques described herein may operate in systems that are operating with input and/or output peripherals. For example, a device controlling digital signage (e.g., advertisements on a mall or billboard) may be considered to be attached to a display, and yet still be stored in an out of reach location to prevent someone from accidentally or deliberately interfering with the digital signs. In the event the device is to be configured, a user may interact with the device using an appropriately configured remote to control emulation of keyboard and/or power signals. Thus, many types of devices may take advantage of techniques described herein.

Figure 1:
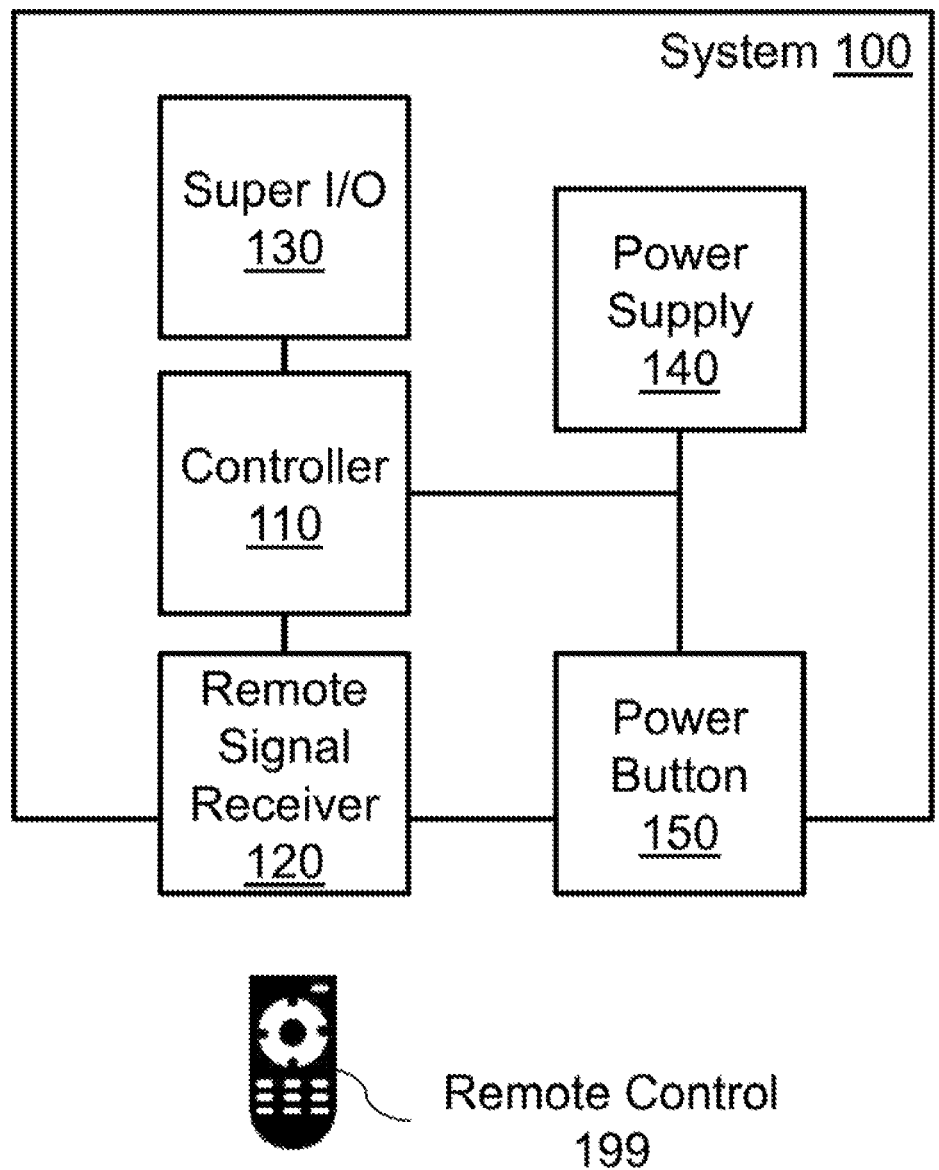
FIG. 1 illustrates an example system associated with keyboard emulation.

FIG. 1 illustrates an example system associated with keyboard emulation. It should be appreciated that the items depicted in FIG. 1 are illustrative examples, and many different systems, devices, and so forth, may operate in accordance with various examples.

FIG. 1 illustrates a system 100 associated with keyboard emulation. In this example, system 100 may be a system operating without a display, a keyboard, a mouse, and so forth. In other examples, system 100 may be stored in an out of reach location or amongst numerous other devices similarly configured to system 100.

System 100 includes a controller 110. Controller 110 may be connected with several aspects of system 100 in a manner that allows controller 110 to emulate input from various components of system 100 and or peripherals that could be attached to system 100. Thus, controller 110 may include circuitry that directly connects to the other components of system 100. Controller 110 may control the various components of system 100 based on signals received from a remote control 199 via a remote signal receiver 120. While a remote control 199 is illustrated in FIG. 100, other technologies or communication devices could be configured to interact with remote signal receiver. For example, while remote control 199 may use an infrared technology to communicate with remote signal receiver 120, in other examples, remote control 199 or a device (e.g., a cell phone) acting in the place of remote control 199 may operate using, for example, Bluetooth, ZigBee, radio frequency, Wi-Fi, Z-Wave, and so forth.

In various examples, the signals received from remote control 199 may be specifically designed into remote control 199. Thus, remote control 199 may include aspects of a keyboard. In other examples, the signals received from remote control 199 may be programmatically generated either by remote control 199 itself or based on a signal received from a remote device. By way of illustration, after a system administrator detects a failure of system 100, the administrator or an application controlled by the administrator may generate a set of instructions and embed them on remote control 199. When the administrator reaches the vicinity of system 100, the administrator may press a button on remote control 199 which may cause remote control 199 to play back the set of instructions to remote signal receiver 120.

The signals received by controller 110 via remote signal receiver 120 may cause controller 110 to emulate inputs specified in the signals to the components of system 100. For example, controller 110 is connected to a super input/output (super I/O) controller 130 of system 100. Super I/O 130 may be an integrated circuit embedded in system 100 that combines interfaces for a variety of components of system 100. These components may include a keyboard controller that allows for receiving keyboard inputs that can then be interpreted by, for example, a processor of system 100. Thus, controller 110 may facilitate emulating keyboard inputs to system 100 by, for example, generating signals that would be generated by presses of a keyboard. In other examples, the controller may cause emulation of keyboard inputs by controlling super I/O 130 to act as though the keyboard inputs had been received.

While the keyboard inputs could theoretically be interpreted at a variety of points during operation of system 100, the ability to emulate keyboard inputs may be specifically desirable during a basic input/output system (BIOS) mode of operation of system 100. This may be because system 100 has limited functionality while in the BIOS state. For example, in the BIOS state, system 100 may not have networking capability that would allow selection of settings until after system 100 has successfully loaded an operating system. Consequently, selecting appropriate boot settings without the ability to emulate the keyboard may involve physical access to system 100 which may mean accessing system 100 from amongst many in a server rack, or pulling system 100 from an out of reach location. Instead, emulation of keyboard input to select boot settings based on signals received from remote control 199, system 100 may be able to boot into a mode controllable over a network without direct physical access to system 100.

In another example, controller 110 may also be connected to a power supply 140. This may allow controller 110 to emulate inputs to a physical power button 150 to power supply 140. This may allow, for example, controller 110 to turn system 100 on or off, hard reset system 100, cause system 100 to enter a sleep mode, and so forth. In some examples, controller 110 may connect directly to power supply 140. However, as illustrated here, controller 110 may interface directly with circuitry connecting power supply 140 and power button 150. Thus, controller 110 and remote signal receiver 120 may be circuitry built into system 110 during manufacturing, as opposed to an accessory or peripheral attached to system 100 after system 100 has been shipped.

In some examples, it may be desirable to ensure certain security checks are made before controller 110 takes action in response to a signal from remote control 199. In some examples, a pairing action may be performed during, for example, an initial setup of system 100, controller 110, and/or remote control 199. The pairing process may ensure that unauthorized devices and/or users cannot control system 100. In other examples, remote control 199 may be able to transmit a signal that is specifically configured to control specifically system 100, and not control other nearby systems also configured with a remote signal receiver that can emulate inputs (e.g., other similarly configured systems on the same server rack). In other examples, remote control 199 may transmit a signal that authenticates itself to controller 110 to prevent unauthorized actions from being taken by controller 110.

It is appreciated that, throughout this description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to hardware, firmware, software stored on a computer-readable medium or in execution on a machine, and/or combinations of each to perform a function(s) or an action(s), and/or to cause a function or action from another module, method, and/or system. A module may include a software controlled microprocessor, a discrete module, an analog circuit, a digital circuit, a programmed module device, a memory device containing instructions, and so on. Modules may include gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

Figure 2:
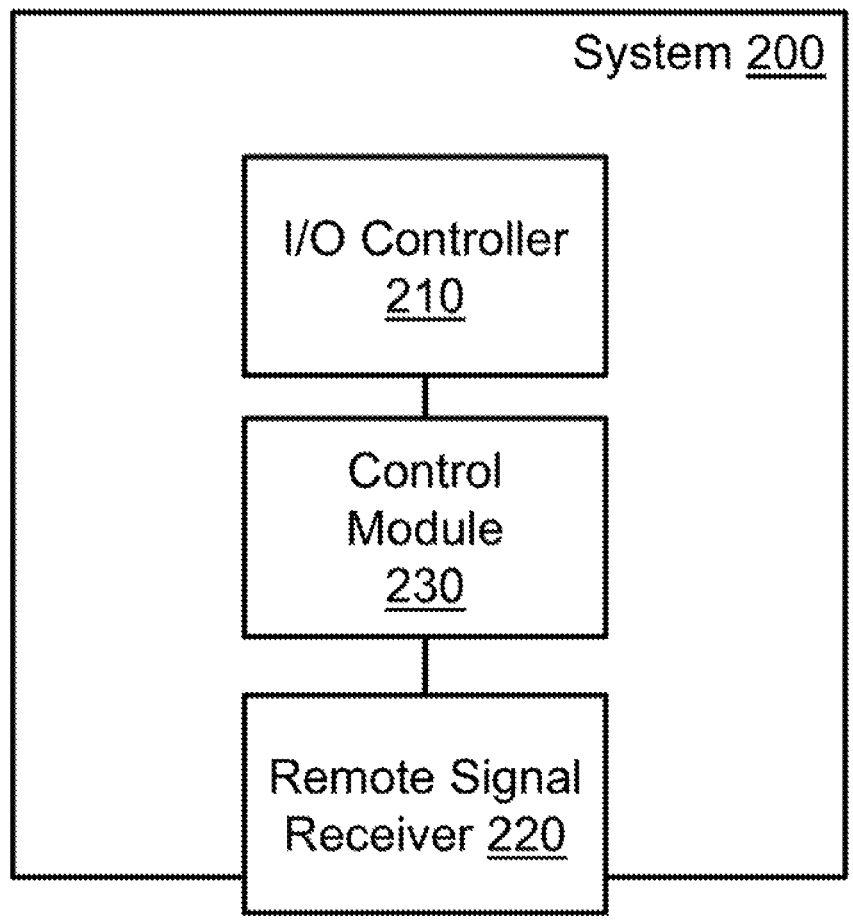
FIG. 2 illustrates another example system associated with keyboard emulation.

FIG. 2 illustrates a system 200. System 200 may be, for example, a computer or server designed to take up a limited amount of space in an out of the way location. For example many servers are stored in closets or racks, out of the way of persons who work with the data and applications on the servers. System 200 may also be configured to be controlled remotely via a network connection while system 200 is under normal operating circumstances. Thus, system 200 may not usually have certain input and/or output peripherals (e.g., keyboard, display) and accessories attached to system 200. System 200 includes an input/output controller 210. In some examples, the input/output controller may be a super I/O controller of system 200. Input/output controller 210 may be able to receive input from various components of system 200 including from ports to which peripherals could hypothetically be connected.

System 200 also includes a remote signal receiver 220. Remote signal receiver 220 may communicate via, for example, infrared signals, Bluetooth, ZigBee, radio frequency, Wi-Fi, Z-Wave, and so forth. Remote signal receiver 220 may receive signals from a remote control or other device configured to communicate with remote signal receiver.

System 200 also includes a control module 230. Control module 230 may receive a first signal via remote signal receiver 220. Based on the first signal, control module 230 may communicate with input/output controller 210. For example, control module 230 may control input/output controller 210 to emulate a keyboard input. As used herein, keyboard inputs may include a variety of alphanumeric and other inputs enterable via a keyboard. The keyboard inputs are intended to include, for example, letters in various cases, numbers, special characters, spacing characters, movement directions, special functions, and so forth. The emulated keyboard inputs may control system 200 while system 200 operates in a basic input/output system (BIOS) mode. This may allow, for example, control of selection of boot options during the BIOS mode. Selection of boot options may facilitate restoring system 200 to a state in which system 200 may be controlled and/or managed by a remote entity via a network connection.

Figure 3:
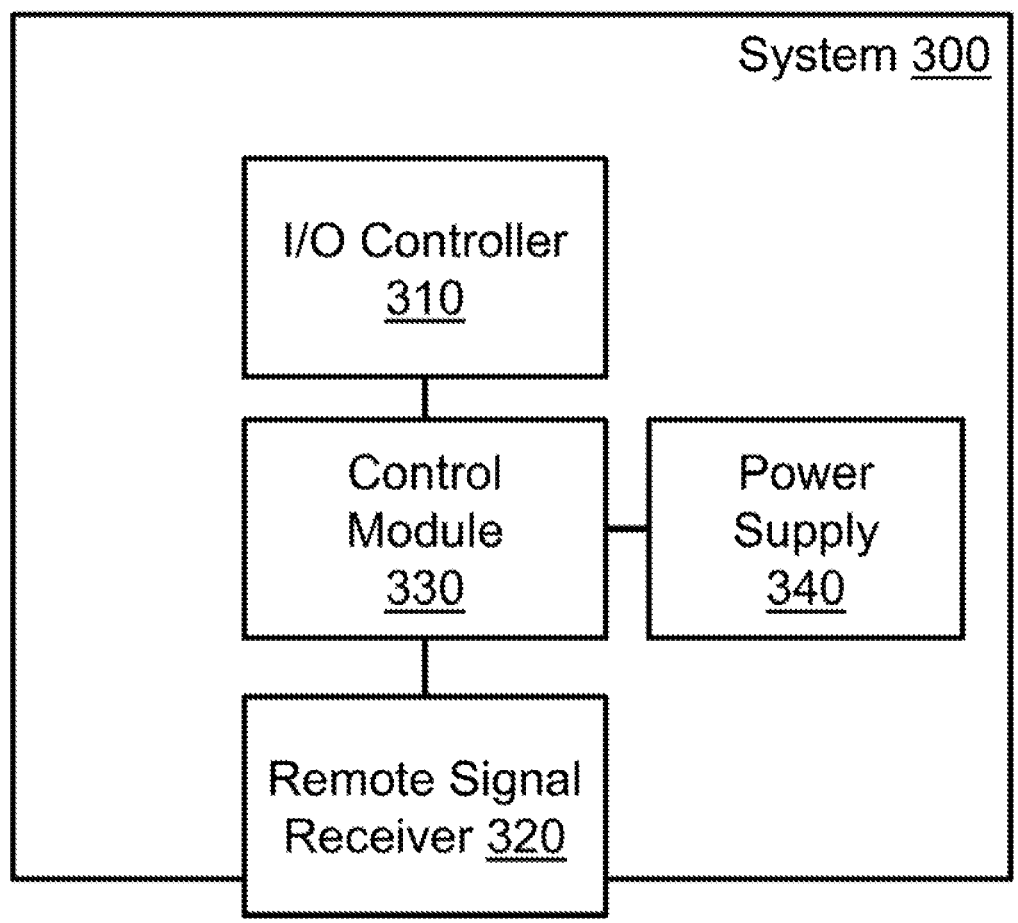
FIG. 3 illustrates another example system associated with keyboard emulation.

FIG. 3 illustrates a system 300 associated with keyboard emulation. System 300 includes several items similar to those described above with reference to system 200 (FIG. 2). For example, system 300 includes an I/O controller 310, a remote signal receiver 320, and a control module 330.

System 300 also includes a power supply 340. Control module 330 may receive a second signal via remote signal 320. Control module 330 may communicate with power supply 340 based on the second signal to emulate a power button input. The emulated power button input may control power supply 340 to, for example, power on, power off, enter a sleep mode, hard reset, and so forth.

Figure 4:
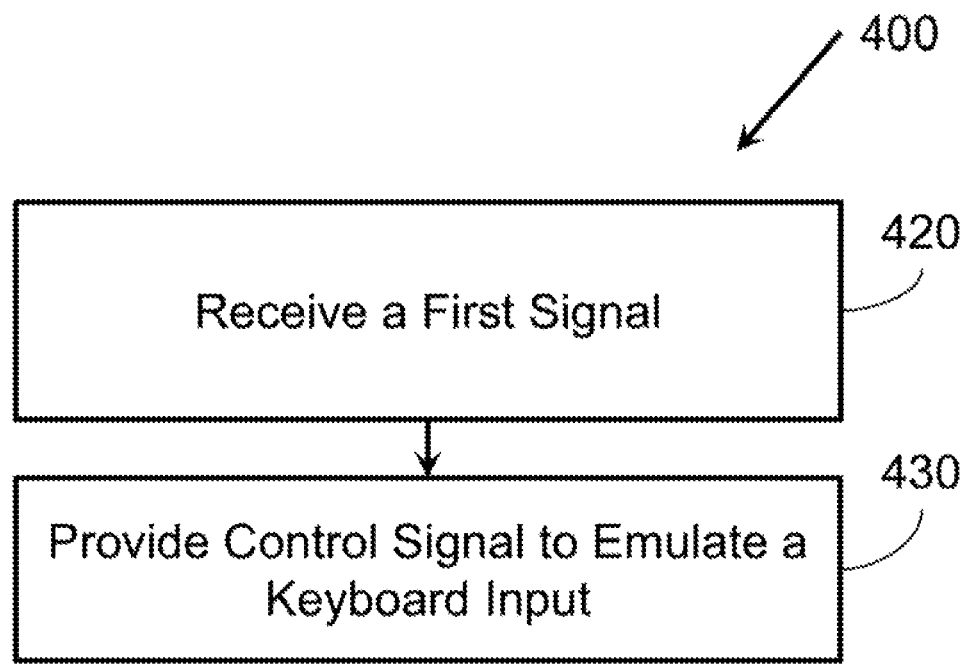
FIG. 4 illustrates a flowchart of example operations associated with keyboard emulation.

FIG. 4 illustrates an example method 400. Method 400 may be embodied on a non-transitory processor-readable medium storing processor-executable instructions. The instructions, when executed by a processor, may cause the processor to perform method 400. In other examples, method 400 may exist within logic gates and/or RAM of an application specific integrated circuit (ASIC).

Method 400 may perform various tasks associated with keyboard emulation. Method 400 includes receiving a first signal at 420. The first signal may be received via a remote signal receiver. The first signal may include instructions intended to control a device. The device may be, for example, a headless device operating without input and/or output peripherals.

Method 400 also includes providing a control signal to an input/output controller of the device at 430. The control signal may control the input/output controller to emulate a keyboard input. The specific keyboard actions emulated may be specified by the first signal. In one example, the keyboard input may control selection of boot settings for the device.

Figure 5:
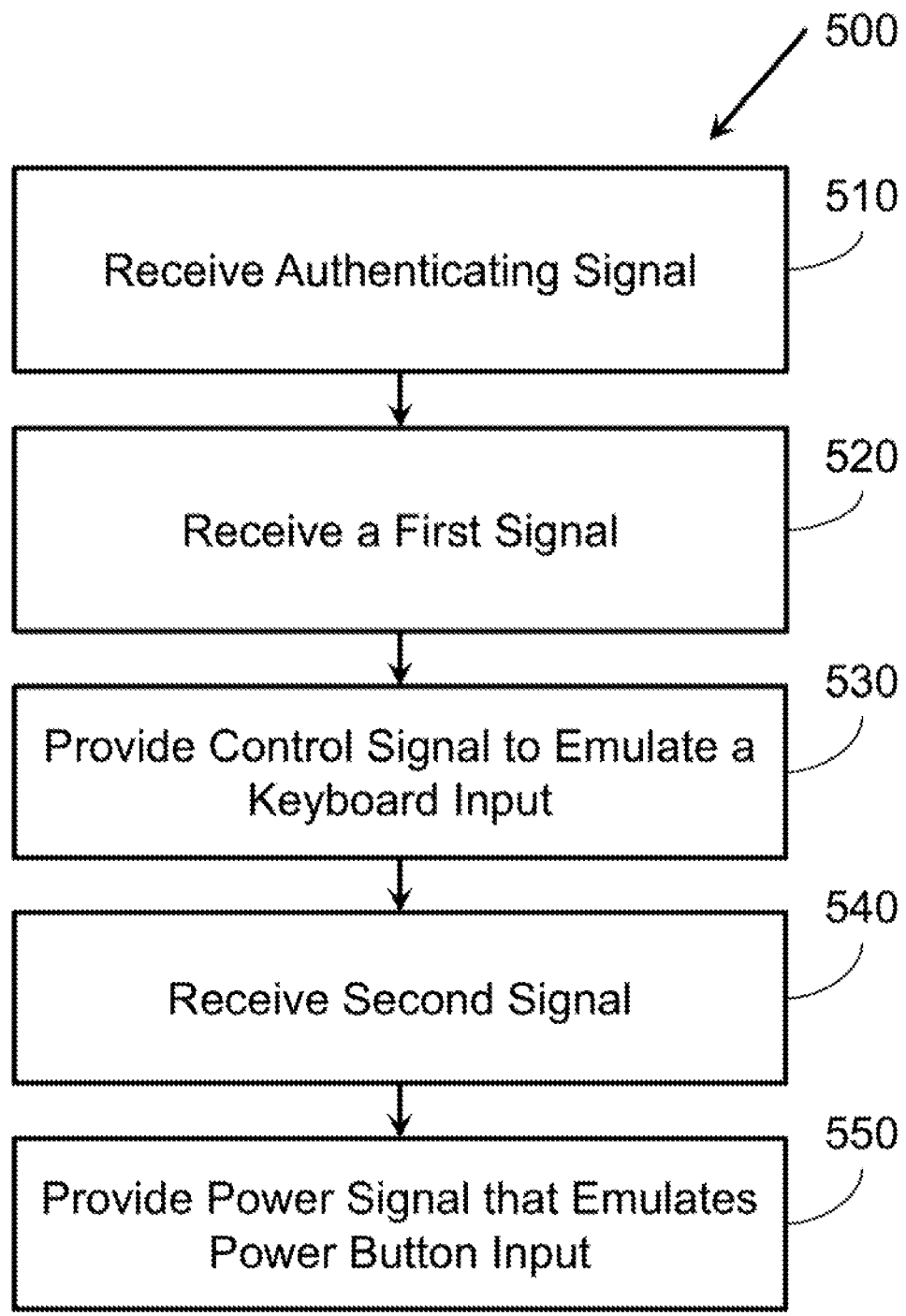
FIG. 5 illustrates a flowchart of example operations associated with keyboard emulation.

FIG. 5 illustrates a method 500 associated with keyboard emulation. Method 500 includes several actions similar to those described above with reference to method 400. For example, method 500 includes receiving a first signal in a device at 520 and providing a control signal at 530.

Method 600 also includes receiving a second signal at 540. The second signal may be received via the remote signal receiver. The second signal may seek to control a power operation of the device. Method 500 also includes providing a power signal at 550. The power signal may be provided to a power supply of the device. The power signal may emulate a power button input for the device.

Method 500 also includes receiving an authenticating signal at 510. The authenticating signal may be received from a device (e.g., a remote control) providing the control signal. In various examples, the authenticating signal may serve a variety of functions. In one example, the authenticating signal may be configured to tie the device providing the control signal to the device performing method 500. By way of illustration, this may link a specific remote control and a specific server. This may be achieved by, for example, communicating a channel for future communications. The device performing method 500 may then listen on this channel for further instructions. In another example, the authenticating signal may be a signal designed prove that the device providing the control signal is authorized to control the device performing method 500. This may prevent unauthorized interactions with the device performing method 500. In another example, the authenticating signal may be a signal designed to identify a specific device to perform actions in a subsequent control signal. This may be desirable when multiple devices that could potentially perform operations of method 500 are in close proximity to one other (e.g., in a server rack).

Figure 6:
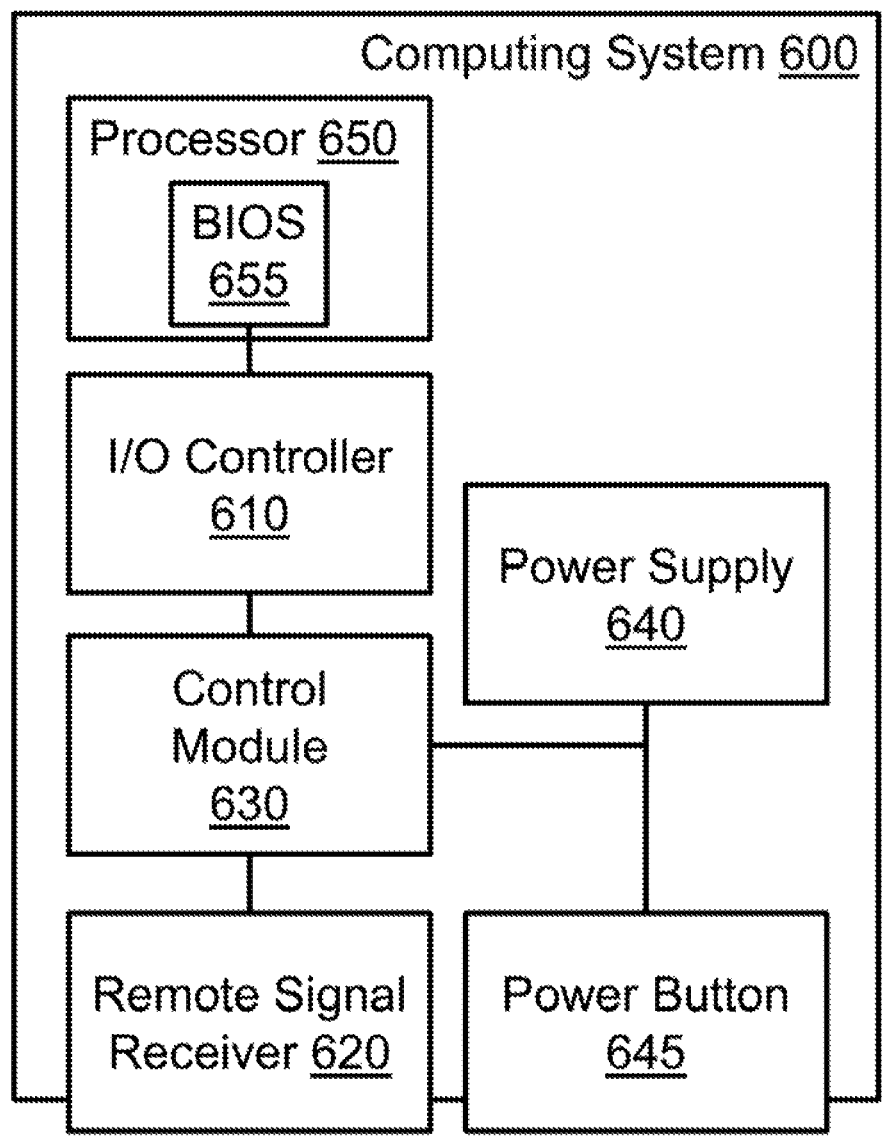
FIG. 6 illustrates an example computing system associated with keyboard emulation.

FIG. 6 illustrates a computing system 600. Computing system includes a basic input/output system (BIOS) in execution by a processor 650. Computing system 600 also includes an I/O controller 610. Computing system 600 also includes a remote signal receiver 620. Computing system 600 also includes a control module 630. Control module 630 may be communicatively coupled to remote signal receiver 620 and input/output controller 610. Control module 630 may emulate a keyboard signal via input/output controller 610 during, for example, power on self-test, operating system startup, and so forth, for entering and setting of bios 655, selection of a boot device, or some other initialization purpose. The keyboard signal may be emulated in response to a signal received via remote signal receiver 620. In some examples, control module 630 may authenticate an aspect of the control signal prior to emulating the keyboard signal.

Computing system 600 also includes a power supply 640. Power supply 650 may be communicatively coupled to control module 630. In this examples, control module 630 is communicatively coupled to the power supply via circuitry connecting the power supply to a power button 645 of computing system 600. In response to a power signal received via remote signal receiver 620, control module 630 may provide a signal to the power supply that emulates an input to the power supply.

In various examples, computing system 600 may be a computer that includes a processor 650 and memory, and other components connected by a bus. Control module 630 may perform keyboard emulation functions for computing system 600. In different examples, control module 630 may be implemented as a non-transitory computer-readable medium storing processor-executable instructions, in hardware, software, firmware, an application specific integrated circuit, and/or combinations thereof.

The instructions may also be presented to processor 650 as data and/or processes that are temporarily stored in memory and then executed by processor 650. Processor 650 may be a variety of processors including dual microprocessor and other multi-processor architectures. Memory may include non-volatile memory (e.g., read only memory) and/or volatile memory (e.g., random access memory). Memory may also be, for example, a magnetic disk drive, a solid state disk drive, a floppy disk drive, a tape drive, a flash memory card, an optical disk, and so on. Thus, memory may store processes and/or data. Computing device 600 may also be associated with other devices including other computers, devices, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A system comprising:
an input/output controller;
a remote signal receiver to receive a first signal from a remote control device separate from the system and that generated the first signal to play back a set of instructions embedded within the remote control device; and
a control module communicatively connected between the input/output controller and the remote signal receiver, the control module to receive the first signal from the remote signal receiver and to communicate with the input/output controller to emulate keyboard input based on the first signal by generating signals that would be generated by the keyboard input or by controlling the input/output controller to act as though the keyboard input has been received.

2. The system of claim 1, further comprising a power supply, and where the control module is further to receive a second signal via the remote signal receiver and communicate with the power supply based on the second signal to emulate a power button input.

3. The system of claim 2, where the power button input controls the power supply to one of, power on, power off, enter a sleep mode, and hard reset.

4. The system of claim 1, where the remote signal receiver communicates via one of, infrared signals, Bluetooth, ZigBee, radio frequency, Wi-Fi, and Z-Wave.

5. The system of claim 1, where the input/output controller is a super input/output controller.

6. The system of claim 1, where the emulated keyboard input controls the system during a basic input/output system (BIOS) mode.

7. The system of claim 1, where the emulated keyboard input controls selection of boot options during a basic input/output system (BIOS) mode.

8. A method comprising:
   receiving, by a remote signal receiver of a device, a first signal from a remote control device separate from the device that generated the first signal to play back a set of instructions embedded within the remote control device;
   receiving, by a control module of the device from the remote signal receiver to which the control module is communicatively connected, the first signal to control the device; and
   providing, by the control module to an input/output controller of the device to which the control module is communicatively connected, a control signal to emulate keyboard input to control selection of boot settings for the device, by generating signals that would be generated by the keyboard input or by controlling the input/output controller to act as though the keyboard input has been received.

9. The method of claim 7, further comprising:
   receiving, by the control module from the remote signal receiver, a second signal to control a power operation of the device; and
   providing, by the control module to a power supply of the device, a power signal that emulates a power button input for the device.

10. The method of claim 8, where the device is a headless device.

11. The method of claim 8, further comprising receiving, by the control module from the remote signal receiver, an authenticating signal from the remote control device.

12. A computing system comprising:
   an input/output controller;
   a remote signal receiver to receive a first signal from a remote control device separate from the computing system and that generated the first signal to play back a set of instructions embedded within the remote control device; and
   a control module communicatively coupled between the remote signal receive and the input/output controller to, in response to the first signal received by the remote signal receiver, emulate keyboard input via the input/output controller to configure a boot setting, by generating signals that would be generated by the keyboard input or by controller the input/output controller to act as though the keyboard input has been received.

13. The computing system of claim 12, further comprising:
   a power supply,
   wherein the control module, in response to a power signal received via the remote signal receiver, is to provide a signal to the power supply that emulates an input to the power supply.

14. The computing system of claim 13, where the control module is communicatively coupled to the power supply via circuitry connecting the power supply to a power button of the computing system.

15. The computing system of claim 12, where the control module authenticates an aspect of the control signal.

16. The system of claim 1, wherein the control module is to communicate with the input/output controller to emulate the keyboard input based on the first signal by generating the signals that would be generated by the keyboard input.

17. The system of claim 1, wherein the control module is to communicate with the input/output controller to emulate the keyboard input based on the first signal by controlling the input/output controller to act as though the keyboard input had been received.

18. The system of claim 1, wherein the input/output controller and the control module are each separate from any basic input/output system (BIOS) of the system.

19. The method of claim 8, wherein the input/output controller and the control module are each separate from any basic input/output system (BIOS) of the system.

20. The computing system of claim 12, further comprising:
   a basic input/output system (BIOS) in execution by a processor,
   wherein the input/output controller and the control module are each separate from the basic input/output system (BIOS),
   and wherein the boot setting is a boot setting of the BIOS.

* * * * *